UNITED STATES PATENT OFFICE.

JAMES EDWIN FAIRFAX, OF AIKEN, SOUTH CAROLINA, ASSIGNOR OF ONE-HALF TO GEORGE R. WEBB, OF AIKEN, SOUTH CAROLINA.

PLASTER.

1,122,891. Specification of Letters Patent. Patented Dec. 29, 1914.

No Drawing. Application filed December 10, 1913. Serial No. 805,786

*To all whom it may concern:*

Be it known that I, JAMES EDWIN FAIRFAX, a citizen of the United States, and a resident of Aiken, in the county of Aiken and State of South Carolina, have invented a new and Improved Plaster, of which the following is a full, clear, and exact description.

My invention relates to means for holding the set of plaster of Paris and for hardening the same.

The object thereof is to provide a simple and inexpensive plaster which is easily prepared and which will set rapidly when the same is cast, rendering the surface of the plaster highly polished. I obtain the above object by adding to the plaster of Paris a certain amount of slaked lime and then adding stale beer, apple jelly and salt in proper proportions.

The composition is prepared as follows: The stale beer, apple jelly and salt are mixed in water, and to this mixture is then added the plaster of Paris until a proper consistency is obtained. The plaster of Paris added to the mixture contains one-twentieth of its weight of air-slaked lime thoroughly mixed therewith.

The relative quantities of the ingredients that I prefer to use are as follows: To one gallon of water one ounce of stale beer is added, then one-half ounce of apple jelly, preferably the "Bull Head" brand, and one hundred grains of salt. This is thoroughly mixed and to the mixture is then added the plaster of Paris containing the one-twentieth of its weight of air-slaked lime until a proper consistency of the ingredients is obtained, so that the same can be easily worked. The stale beer should preferably be left open for about twenty-four hours before mixing with the other ingredients. The said beer helps to hold the set of the plaster of Paris. The apple jelly also helps to hold the set of the plaster of Paris, and the salt brings the beer and apple jelly together, thus adding to the hardness of the plaster of Paris. This mixture is preferably to be used for casting purposes, but it can be used for any other similar purpose.

Having thus described my invention, I claim as new and desire to secure by Letters Patent:

1. A plaster consisting of a mixture of stale beer, apple jelly, salt, plaster of Paris, and air-slaked lime in the proportion stated, to which water is added to form a proper consistency for molding, and which plaster is characterized by forming a polished surface when cast.

2. A plaster consisting of one gallon of water, one ounce of stale beer, half an ounce of apple jelly, 100 grains of salt, and enough plaster of Paris containing one-twentieth of its weight of air-slaked lime to bring the mixture to its proper consistency for molding.

In testimony whereof I have signed my name to this specification in the presence of the subscribing witnesses.

JAMES EDWIN FAIRFAX.

Witnesses:
 FRAMPTON TOOLE,
  his
 NATHAN × JONES,
  mark
 G. L. TOOLE.